United States Patent
Tsukamoto et al.

[11] Patent Number: 5,908,461
[45] Date of Patent: Jun. 1, 1999

[54] CONTROL SYSTEM FOR AUTOMATIC TRANSMISSION

[75] Inventors: Kazumasa Tsukamoto, Toyota; Yoshikazu Sakaguchi; Muneo Kusafuka, both of Anjo; Masao Saito; Masamichi Unoki, both of Nishio; Junichi Nishimura, Anjo, all of Japan

[73] Assignee: Aisin AW Co., Ltd., Anjo, Japan

[21] Appl. No.: 08/657,616

[22] Filed: May 31, 1996

[30] Foreign Application Priority Data

May 31, 1995 [JP] Japan .................................... 7-133009

[51] Int. Cl.$^6$ ...................................................... G06G 7/70
[52] U.S. Cl. ............................... 701/56; 701/51; 701/55; 477/120; 477/901
[58] Field of Search ....................... 364/424.08, 424.082, 364/424.083, 424.093, 424.094, 426.029, 423.098; 477/109, 125, 130, 155, 120–144, 901–906, 129, 121, 117, 114, 126, 152, 154; 475/128, 63; 701/51, 55, 56, 54

[56] References Cited

U.S. PATENT DOCUMENTS

| | | | |
|---|---|---|---|
| 4,338,666 | 7/1982 | Suzuki et al. | 701/56 |
| 4,380,048 | 4/1983 | Kishi et al. | 701/56 |
| 4,889,015 | 12/1989 | Kondo | 701/56 |
| 4,922,428 | 5/1990 | Takahashi | 364/426.042 |
| 4,926,329 | 5/1990 | Stelter et al. | 364/424.098 |
| 5,035,160 | 7/1991 | Morita | 701/56 |
| 5,048,631 | 9/1991 | Etoh | 364/426.042 |
| 5,078,109 | 1/1992 | Yoshida et al. | 123/350 |
| 5,183,128 | 2/1993 | Ito et al. | 364/426.01 |
| 5,231,582 | 7/1993 | Takahashi et al. | 701/56 |
| 5,269,391 | 12/1993 | Ito et al. | 364/426.01 |
| 5,317,937 | 6/1994 | Yoshizawa et al. | 477/120 |
| 5,319,555 | 6/1994 | Iwaki et al. | 364/424.086 |
| 5,337,630 | 8/1994 | Sakai et al. | 364/424.086 |
| 5,392,215 | 2/1995 | Morita | 701/94 |
| 5,393,278 | 2/1995 | Kyushima et al. | 477/120 |
| 5,522,779 | 6/1996 | Tabata et al. | 477/126 |
| 5,542,887 | 8/1996 | Tsukamoto et al. | 475/63 |
| 5,557,519 | 9/1996 | Morita | 701/1 |
| 5,611,754 | 3/1997 | Haga et al. | 477/181 |
| 5,692,990 | 12/1997 | Tsukamoto et al. | 477/93 |
| 5,692,991 | 12/1997 | Iwata et al. | 477/98 |
| 5,728,026 | 3/1998 | Sakaguchi et al. | 477/107 |
| 5,741,200 | 4/1998 | Taniguchi et al. | 477/93 |
| 5,749,802 | 5/1998 | Tanahashi et al. | 475/120 |

FOREIGN PATENT DOCUMENTS

| | | |
|---|---|---|
| 61-45160 | 3/1986 | Japan . |
| 2-266154 | 10/1990 | Japan . |
| 1 281 040 | 7/1972 | United Kingdom . |

*Primary Examiner*—Jacques H. Louis-Jacques
*Attorney, Agent, or Firm*—Oliff & Berridge, PLC

[57] ABSTRACT

A control system for an automatic transmission having a running status detector for detecting the running status of a vehicle including an input torque from an engine; a running resistance estimator for estimating a running resistance on the basis of the running status of the vehicle; a running resistance comparator for comparing the estimated running resistance and a preset reference value; and a shift characteristic changing device for changing shift characteristics in accordance with the comparison result of the running resistance comparator. The automatic transmission control system further has a temperature sensor for detecting a temperature relating to the temperature of the engine and a decision device for determining a specific engine running status, in which the output of the engine drops, on the basis of an output signal coming from the temperature sensor. The running resistance comparator changes the reference value in accordance with the determination of the decision device.

2 Claims, 6 Drawing Sheets

E/G TORQUE

| THROTTLE OPEN (%) E/G RPM | 0 | 11.1 | 16.7 | 22.2 | |
|---|---|---|---|---|---|
| 1000 | 5 | 70 | 100 | 115 | |
| 1500 | 0 | 60 | 95 | 120 | |
| 2000 | 0 | 55 | 85 | 115 | |
| 2500 | 0 | 40 | 75 | 110 | |
| 3000 | 0 | 35 | 50 | 90 | |

FIG.6

TORQUE RATIO

| SPEED RATIO | TORQUE RATIO |
|---|---|
| 0 | 2.5 |
| 0.1 | 2.0 |
| 0.2 | 1.9 |
| 0.3 | 1.8 |
| 0.4 | 1.6 |
| 0.5 | 1.5 |
| 0.6 | 1.3 |
| 0.7 | 1.2 |
| 0.8 | 1.0 |
| 0.9 | 1.0 |
| 1.00 | 1.0 |

FIG.7

RUN RESISTANCE MAP

| VEHICLE SPEED | 0 | 10 | 20 | 30 | 40 | 50 | 60 | 70 | 80 | 90 | 100 |
|---|---|---|---|---|---|---|---|---|---|---|---|
| RUN RESISTANCE FLAT ROAD | 265 | 270 | 280 | 300 | 330 | 360 | 400 | 460 | 520 | 580 | 660 |

FIG.8

LOSS MAP

| GEAR RATIO | 1st | 2nd | 3rd | 4th |
|---|---|---|---|---|
| GEAR LOSS | 39.0 | 35.5 | 41.5 | 45.5 |

FIG.9

BASE OFFSET

| THROTTLE OPEN (%) / GEAR STAGE | 0 | 10 | 20 | 30 | 40 | 50 |
|---|---|---|---|---|---|---|
| 2nd | 0 | 0 | 0 | 0.2 | 0.3 | 0.4 |
| 3rd | 0 | 0 | 0 | 0.1 | 0.2 | 0.3 |
| 4th | 0 | 0 | 0 | 0.1 | 0.2 | 0.2 |

FIG.10

CONTROL SYSTEM FOR AUTOMATIC TRANSMISSION

BACKGROUND OF THE INVENTION

1. Field of the Invention

The invention relates to a control system for an automatic transmission, for changing a shift map by comparing an acceleration from an input torque and an acceleration from a vehicle speed to estimate a running resistance and, more particularly, to a control system for an automatic transmission for changing the shift map accurately even when the engine is cold.

2. Related Art

In the control system for an automatic transmission in the prior art, a gear change is effected according to predetermined shift characteristics. However, these shift characteristics are determined on the basis of an ordinary running status so that they cannot always satisfy the driver for the road gradient situations of uphill or downhill roads, for example. In order to achieve a gear change matching the road gradient situations of uphill or downhill roads, therefore, there has been proposed the so-called "hill control" (as disclosed in Japanese Patent Laid-Open No. 45160/1986) for changing the shift characteristics according to the road gradient situation, as determined from a running resistance, by estimating the running resistance from the running status of a vehicle as including an input torque coming from the engine.

In the prior art described above, however, the engine output drops at cold or overheated conditions of the engine, for example. As a result, a decrease in accuracy occurs that can result in a misjudgment that an uphill road is being followed even though the vehicle actually is running on a flat road. This may result in a misapplication of the hill control.

In order to solve this problem, there has been proposed a technique (as disclosed in Japanese Patent Laid-Open No. 266154/1990) for selecting a map to calculate a running resistance estimated value in accordance with an engine water temperature and an A/T oil temperature.

When the running resistance estimated value calculating map is to be selected, as in the prior art, according to the engine water temperature or the A/T oil temperature, a memory having a larger capacity is necessary for storing the maps according to the temperatures. When the aforementioned hill control is added to the existing electronic control unit (ECU), for example, the excessive data required for the hill control may make the memory short of capacity, and the memory may have to be replaced by another having a larger capacity. Moreover, this change in the memory makes it necessary to change the circuit design for the entire ECU. Further, in order to prepare the data for the running resistance estimated value computing maps, there are required a number of steps for calibrations.

SUMMARY OF THE INVENTION

The invention has an object to provide a control system for an automatic transmission, which can not only effect the hill control accurately, even when the engine output drops, but also prevents any shortage of memory by reducing the memory consumption for the hill control and can reduce the number of steps required for calibration.

In order to achieve the above-specified object, according to the invention, (1) there is provided a control system for an automatic transmission, comprising running status detecting means for detecting the running status of a vehicle, to include an input torque from an engine; running resistance estimating means for estimating a running resistance on the basis of the running status of the vehicle; running resistance comparing means for comparing the estimated running resistance and a preset reference value; and shift characteristic changing means for changing shift characteristics in accordance with the comparison result of the running resistance comparing means. The automatic transmission control system further comprises temperature detecting means for detecting a temperature relating to the temperature of the engine; and decision means for determining a specific engine running status, in which the output of the engine drops, on the basis of an output signal coming from the temperature detecting means. The running resistance comparing means changes the reference value in accordance with the determination of the decision means.

(2) In a control system for an automatic transmission as set forth in item (1), the running resistance comparing means changes the reference value to the running resistance increasing side when the specific engine running status is determined by the decision means.

(3) In a control system for an automatic transmission as set forth in item (1) or (2), the reference value includes a first reference value and a second reference value that is closer to the running resistance decreasing side than the first reference value. The shift characteristic changing means changes the shift characteristics to those for uphill roads when the estimated running resistance is closer in the running resistance comparing means to the running resistance increasing side than the first reference value, and to those for flat roads when the estimated running resistance is closer to the running resistance decreasing side than the second reference value, but does not change the shift characteristics when the estimated running resistance is between the first and second reference values.

(4) There is provided a control system for an automatic transmission, comprising running status detecting means for detecting the running status of a vehicle, as including an input torque from an engine; reference acceleration computing means for computing the acceleration of the vehicle on a flat road from the running status of the vehicle; actual acceleration computing means for computing the actual acceleration of the vehicle; running resistance estimating means for estimating a running resistance on the basis of the reference acceleration and the actual acceleration; running resistance comparing means for comparing the estimated running resistance and a preset reference value; and shift characteristic changing means for changing shift characteristics in accordance with the comparison result of the running resistance comparing means. The automatic transmission control system further comprises temperature detecting means for detecting a temperature relating to the temperature of the engine; and decision means for determining a specific engine running status, in which the output of the engine drops, on the basis of an output signal coming from the temperature detecting means when the temperature relating to that of the engine is lower than a preset reference temperature. The running resistance comparing means changes the reference value to a running resistance increasing side when the specific engine running status is determined in the decision means.

(5) In a control system for an automatic transmission as set forth in item (4), the reference value includes a first reference value and a second reference value closer to the running resistance decreasing side than the first reference value. The shift characteristic changing means changes the shift characteristics to those for uphill roads when the estimated running resistance is closer in the running resistance comparing means to the running resistance increasing side than the first reference value, and to those for flat roads when the estimated running resistance is closer to the running resistance decreasing side than the second reference value, but does not change the shift characteristics when the estimated running resistance is between the first and second reference values.

(6) In a control system for an automatic transmission according to item (4) or (5), the reference acceleration is computed by weighting and averaging the preceding reference accelerations and the present reference acceleration, and the actual acceleration is computed by weighting and averaging the preceding actual accelerations and the present actual acceleration.

BRIEF DESCRIPTION OF THE DRAWINGS

The invention will be described with reference to the figures, in which:

FIG. 6 is an exemplary map of the relationship between throttle opening and engine RPM;

FIG. 7 is an exemplary map for determining torque ratio;

FIG. 8 is an exemplary running resistance map;

FIG. 9 is an exemplary map for determining gear loss; and

FIG. 10 is an exemplary map for determining a base offset.

DESCRIPTION OF THE PREFERRED EMBODIMENT

An embodiment of the invention will be described in detail in the following with reference to the accompanying drawings.

Figure 1:
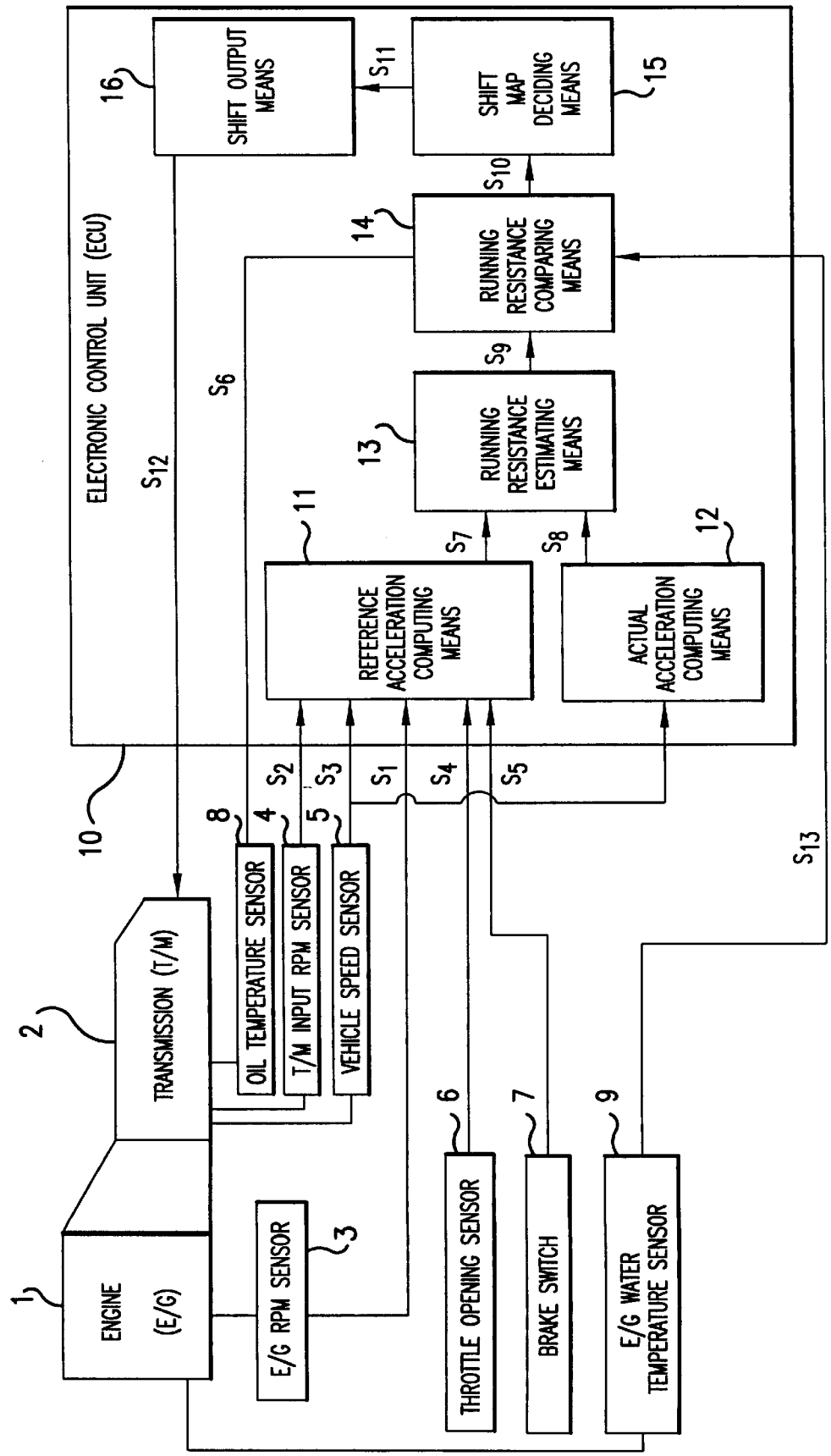
FIG. 1 is a schematic diagram showing a control system for an automatic transmission according to an embodiment of the invention.

As shown in FIG. 1, a transmission (T/M) 2 is connected to an engine (E/G) 1 through a torque converter (unnumbered). The RPM of the E/G 1 is detected by an E/G RPM sensor 3. An E/G RPM signal $S_1$ output from the E/G RPM sensor 3 is input to a reference acceleration computing means 11 found in an electronic control unit (ECU) 10. On the other hand, the RPMs relating to the T/M 2 are detected by a T/M input RPM sensor 4 and a vehicle speed sensor 5. A T/M input RPM signal $S_2$ is output from the T/M input RPM sensor 4 and input to the reference acceleration computing means 11 and a vehicle speed signal $S_3$ is output from the vehicle speed sensor 5 and input to the reference acceleration computing means 11 and an actual acceleration computing means 12. An E/G water temperature sensor 9 detects the temperature information of the E/G 1 and provides a temperature signal $S_{13}$ to a running resistance comparing means 14.

Moreover, a throttle opening signal $S_4$ and a brake switch signal $S_5$ are output from a throttle opening sensor 6 and a brake switch 7, respectively and individually input to the reference acceleration computing means 11.

A running resistance estimating means 13 estimates the running resistance on the basis of information of signals $S_7$ and $S_8$ coming from the reference acceleration computing means 11 and the actual acceleration computing means 12 respectively. The running resistance estimated by the running resistance estimating means 13 is sent as estimation information $S_9$ to the running resistance comparing means 14. The output signal $S_{13}$ from the E/G water temperature sensor 9 is fetched to determine the running status of the E/G, i.e., whether the engine is cold. On the basis of the information $S_{10}$ from the running resistance comparing means 14 for comparing the running resistance, the shift map to be used is determined by shift map deciding means 15. On the basis of decision information $S_{11}$ developed by the shift map deciding means 15, a shift output means 16 is actuated to control the T/M 2 by an output signal $S_{12}$ coming from the shift output means 16, thereby to effect the automatic change control in accordance with the shift map.

The temperature relating to that of the E/G 1 is detected in terms of the output signal $S_{13}$ coming from the E/G water temperature sensor 9 but can be replaced by an output signal $S_6$ coming from an oil temperature sensor 8.

Figure 2:
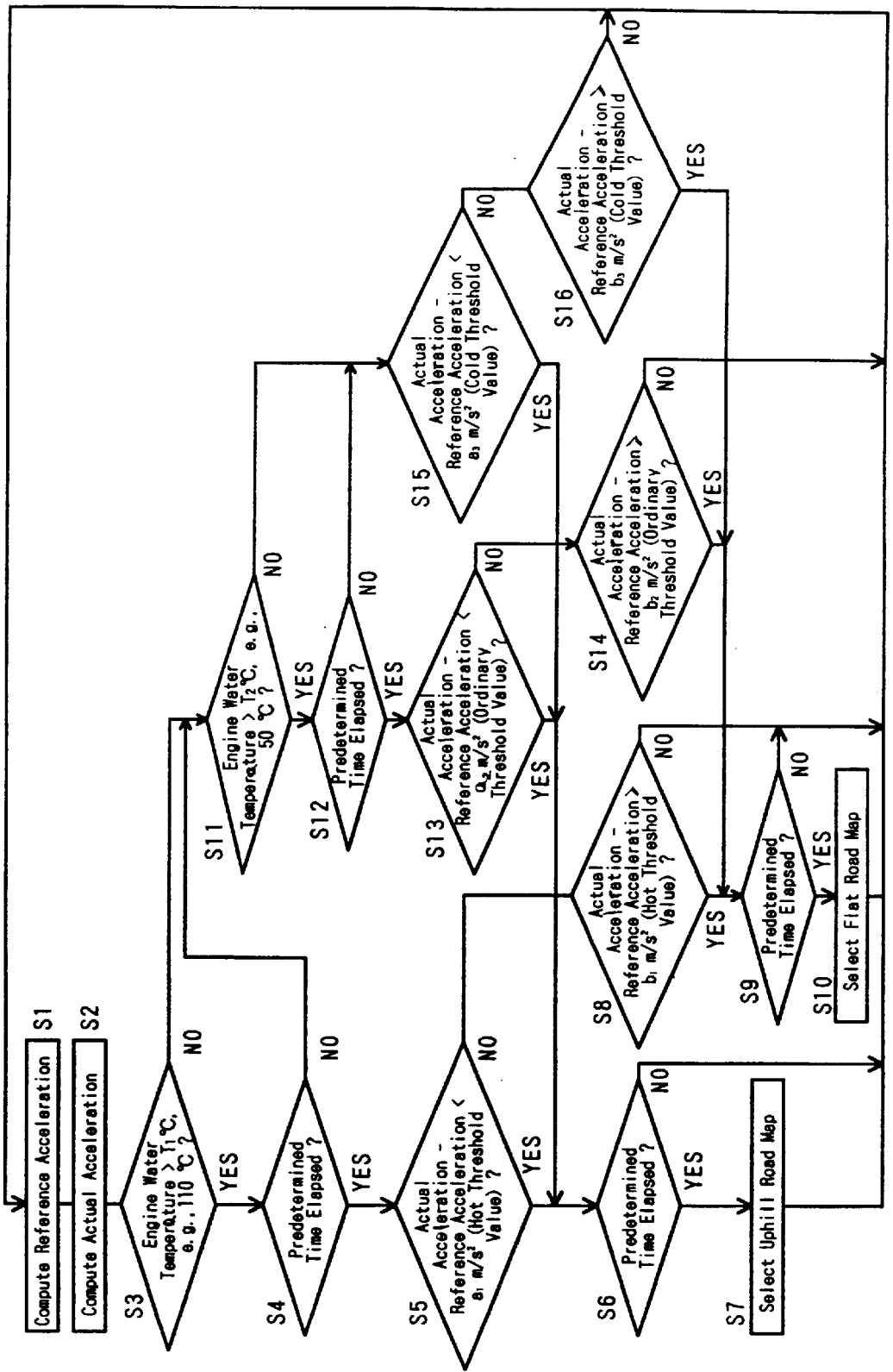
FIG. 2 is a flow chart showing a hill decision threshold value changing routine, according to the engine water temperature, for the automatic transmission according to an embodiment of the invention.

With reference to FIG. 2, a hill decision threshold value changing control using the E/G water temperature according to the embodiment of the invention will be described.

First, a reference acceleration is computed (at Step S1). Specifically, the E/G RPM signal $S_1$ as output from the E/G RPM sensor 3, the T/M RPM signal $S_2$ as output from the T/M input RPM sensor 4, the vehicle speed signal $S_3$ as output from the vehicle speed sensor 5, and the throttle opening signal $S_4$ and the brake switch signal $S_5$, as output from the throttle opening sensor 6 and the brake switch 7, respectively, are input to the electronic control unit 10 to compute the reference acceleration.

The computation of the reference acceleration is as follows. The E/G torque is linearly interpolated from a map (such as shown in FIG. 6) on the basis of the throttle opening and the E/G RPM. Next, a speed ratio [(Input RPM of T/M)/(E/G RPM)] is computed from the input/output RPM of the T/M, and the torque ratio corresponding to the speed ratio is determined from a map (such as shown in FIG. 7). Next, the T/M input torque is determined by multiplying the E/G torque by the torque ratio.

A first reference acceleration is determined using the following formula:

First Reference Acceleration=(T/M Input Torque×Gear Ratio×Diff Ratio/Tire Radius−Running Resistance on Flat Road−Gear Loss)/Vehicle Weight.

Here, the running resistance on the flat road is determined in terms of the vehicle speed, and the gear loss is determined from maps (such as shown in FIGS. 8 and 9) at the gear ratio.

A second reference acceleration is determined by the following rounding calculation of the five preceding first reference accelerations, as stored, and the present one of the aforementioned first reference accelerations:

Second Reference Acceleration =

$$\begin{bmatrix} \text{First Reference Acceleration } (k-5) + \\ \text{First Reference Acceleration } (k-4) + \\ \text{First Reference Acceleration } (k-3) + \\ \text{First Reference Acceleration } (k-2) + \\ \text{First Reference Acceleration } (k-1) + \\ \text{First Reference Acceleration } (k) \end{bmatrix} / 6.$$

Here, k–n indicates the n-th preceding value.

Then, the reference acceleration is determined by the following rounding calculation from the corrected second reference acceleration and the immediately preceding reference acceleration.

Here, the value (i.e., base offset) for the correction is determined by linearly interpolating the map (such as shown in FIG. 10) in terms of the gear stage and the throttle opening.

Reference Acceleration (k)=[Reference acceleration (k−1)×3+(Second Reference acceleration−Base Offset)]/4.

The described correction is necessary for correcting the running resistance, the losses other than the gear loss, and the dispersion in the output torque of the individual E/Gs.

Next, an actual acceleration is computed (at Step S2). Specifically, the output signal of the vehicle speed sensor 5 is input to compute the actual acceleration.

The first actual acceleration is determined in the following manner. The first actual acceleration is determined by storing the preceding four vehicle speeds and calculated using the stored speeds and the present vehicle speed, as follows:

First Actual Acceleration={[Vehicle Speed (k)−Vehicle Speed (k−4)]×2+[Vehicle Speed (k−1)−Vehicle Speed (k−3)]}/10.

A second actual acceleration is then determined.

The second actual acceleration is determined by storing the preceding two first actual accelerations and by the following rounding calculation of the two preceding and the present first actual accelerations:

Second Actual Acceleration =

$$\begin{bmatrix} \text{First Actual Acceleration } (k-2) + \\ \text{First Actual Acceleration } (k-1) + \\ \text{First Actual Acceleration } (k) \end{bmatrix} / 3.$$

Here, k–n indicates the value preceding by n.

The actual acceleration is determined from the preceding actual acceleration and the second actual acceleration by the following rounding calculation:

Actual Acceleration (K)=[Actual Acceleration (k−1)×3+Second Actual Acceleration]/4.

Here, k–n indicates the value preceding by n.

In Step S3, it is checked, on the basis of the output signal $S_{13}$ from the E/G water temperature sensor 9 whether the E/G water temperature is greater than $T_1°$ C. (i.e., a reference temperature, such as 110° C.).

If it is found at Step S3 that the reference temperature $T_1°$ C. is exceeded, it is checked at Step S4 whether a predetermined time (e.g., five seconds) has elapsed.

Figure 3:
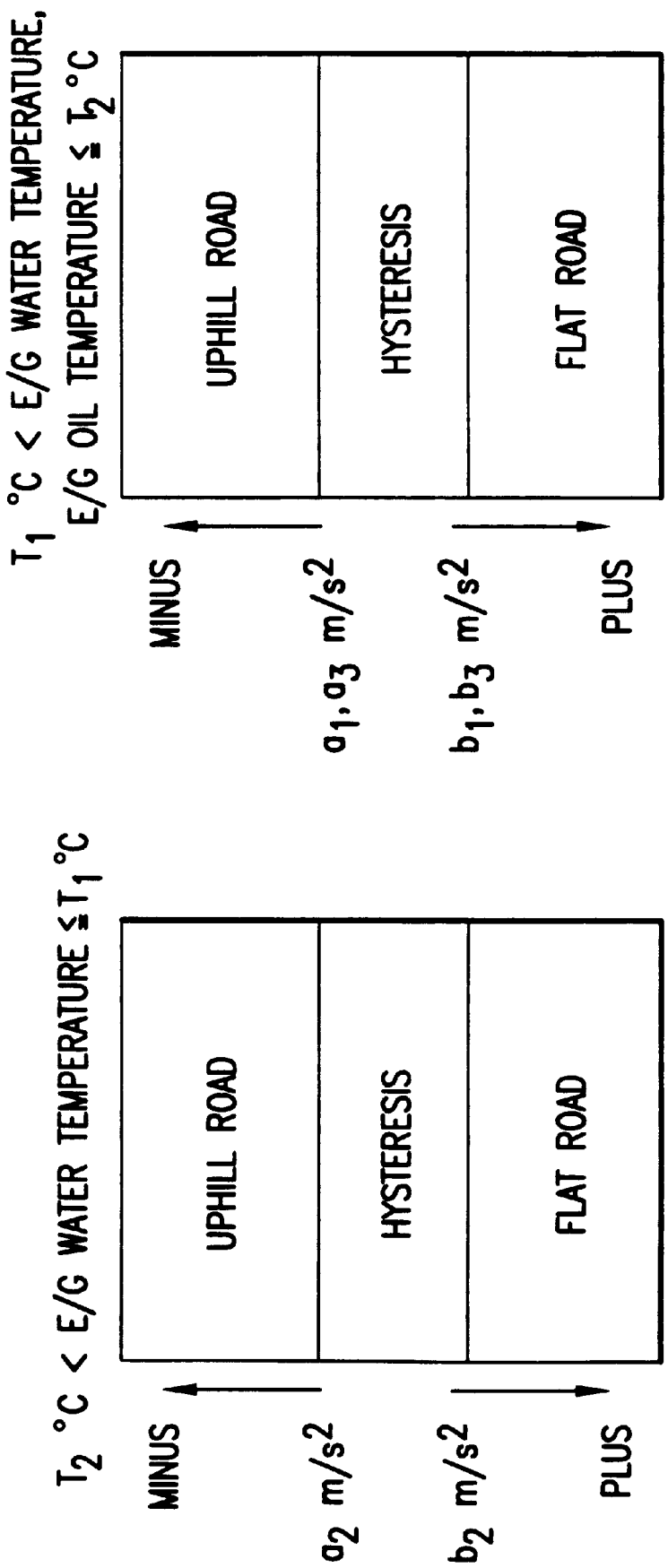
FIG. 3 is an explanatory diagram of the change of the shift characteristics of uphill/downhill roads corresponding to the output of the engine according to the embodiment of the invention.

If it is found at Step S4 that the predetermined time has elapsed, it is checked at Step S5 whether the difference between the actual acceleration and the reference acceleration is below i.e., more negative, $a_1$ m/s² (or a threshold value at a high temperature) such a change reflects an increased running resistance as can be seen in FIG. 3. Here, the value $a_1$ is exemplified by −0.8 m/s².

If the answer in Step S5 is YES, it is checked at Step S6 whether a predetermined time (e.g., five seconds) has elapsed.

Figure 4:
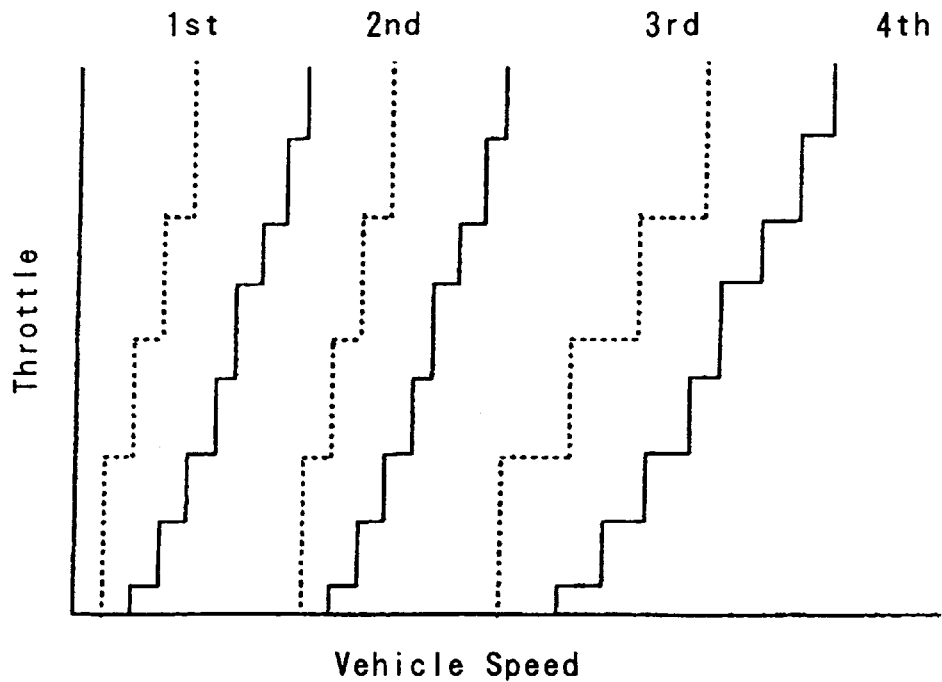
FIG. 4 is a diagram showing a shift map (or shift characteristics) for an uphill road.

If it is found at Step S6 that the predetermined time has elapsed, an uphill road map, as shown in FIG. 4, is selected at Step S7.

If the answer of Step S5 is NO, it is checked at Step S8 whether the difference between the actual acceleration and the reference acceleration is over, i.e., more positive, $b_1$ m/s² such a change reflects a decreased running resistance as shown by FIG. 3. Here, the value $b_1$ is exemplified by −0.6 m/s².

If the answer of Step S8 is YES, it is checked at Step S9 whether a predetermined time (e.g., five seconds) has elapsed.

Figure 5:
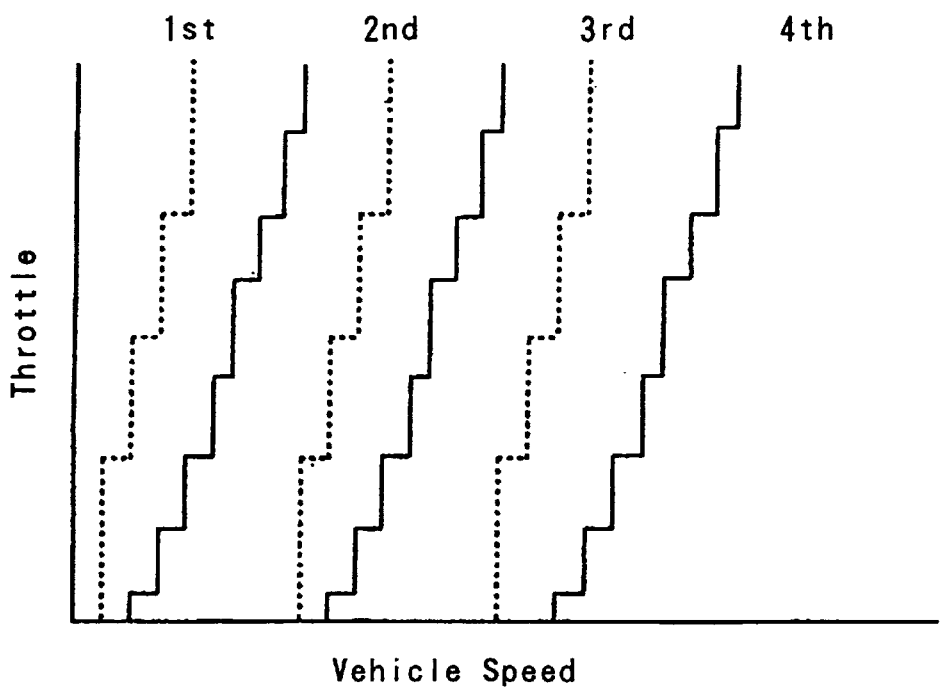
FIG. 5 is a diagram showing a shift map (or shift characteristics) for a flat road.

If the answer of Step S9 is YES, a flat road map, as shown in FIG. 5, is selected at Step S10.

If the answer of Step S3 or Step S4 is NO, it is checked at Step S11, on the basis of the output signal $S_{13}$ coming from the E/G water temperature sensor 9, whether the E/G water temperature is over $T_2°$ C. (e.g., 50° C.).

If the answer of Step S11 is YES, it is checked at Step S12 whether a predetermined time (e.g., five seconds) has elapsed.

If the answer of Step S12 is YES, it is checked at Step S13 whether the difference between the actual acceleration and the reference acceleration is below, i.e., more negative, $a_2$ m/s² (or an ordinary threshold value) such a change reflects an increased running resistance as shown by FIG. 3. Here, the value $a_2$ is exemplified by −0.5 m/s². If the answer of Step S13 is YES, the routine goes to Step S6.

If the answer of Step S13 is NO, it is checked at Step S14 whether the difference between the actual acceleration and the reference acceleration is over, i.e., more positive, $b_2$ m/s² (or an ordinary threshold value) such a change reflects a decrease in the running resistance as shown in FIG. 3. Here, the value $b_2$ is exemplified by −0.3 m/s². If the answer of Step S14 is YES, the routine goes to Step S9.

If the answer of either Step S11 or Step S12 is NO, it is checked at Step S15 whether the difference between the actual acceleration and the reference acceleration is below, i.e., more negative, $a_3$ m/s² (or a threshold value at a cold time) such a change reflects an increase in running resistance as shown in FIG. 3. The value $a_3$ is exemplified by −0.8 m/s². If the answer of Step S15 is YES, then the routine again goes to Step S6.

If the answer of Step S15 is NO, it is checked at Step S16 whether the difference between the actual acceleration and the reference acceleration is over, i.e., more positive, $b_3$ m/s² (or a threshold value at a cold time) such a change reflect a decrease in road resistance as shown in FIG. 3. The value $b_3$ is exemplified by −0.6 m/s². If the answer of Step S16 is YES, the routine again goes to Step S9.

Specifically, according to this control, and shown in FIG. 3, if the difference (i.e., the running resistance estimated value) between the actual acceleration and the reference acceleration is below, i.e., more negative, the ordinary threshold value $a_2$ for the E/G water temperature over $T_2°$ C. and below $T_1°$ C., i.e., for an ordinary engine output, the uphill road map, as shown in FIG. 4, is selected. If the difference (i.e., the running resistance estimated value) between the actual acceleration and the reference acceleration is over, i.e., more positive, the ordinary threshold value $b_2$, the flat road map, as shown in FIG. 5, is selected.

On the other hand, if the difference (i.e., the running resistance estimated value) between the actual acceleration and the reference acceleration is below the high-temperature threshold value $a_1$ and the E/G water temperature is higher than $T_1°$ C., the engine is in the overheat or near overheat status and the engine has a dropping output, the uphill road map, as shown in FIG. 4, is selected. Further, if the difference between the actual acceleration and the reference acceleration is below, i.e., more negative, $a_3$ and the E/G water temperature is lower than $T_2°$ C., the engine is in the cold status, again has a dropping output and the uphill road map is selected. If the difference (i.e., the running resistance estimated value) between the actual acceleration and the reference acceleration is over, i.e., more, positive the high-temperature threshold value $b_1$ and the low-temperature threshold value $b_3$, as changed closer to the running resistance increasing side than the ordinary threshold value $b_2$, the flat road map, as shown in FIG. 5, is selected.

The structure thus far described provides the following advantages.

The drop in the engine output is decided on the basis of the temperature relating to that of the engine so that the reference value for changing the shift characteristics is accordingly changed. As a result, even under the situations in which the output of the engine drops, as when cold or overheated, for example, the hill control is not misjudged but can be properly effected to match the situation of the actual running road surfaces.

The drop in the engine output is decided to accordingly change the reference value for changing the shift characteristics. As compared with the prior art in which the map for computing the estimated value of the running resistance is selected, it is possible to reduce the capacity of the memory and the number of steps by the calibration.

The hysteresis region is set in the reference value for changing the shift characteristics so that the shift characteristics are not changed when the estimated running resistance is in the hysteresis region. As a result, transmission hunting can be prevented at the time of changing the shift characteristics.

Thus, according to the invention, there is provided a control system for an automatic transmission, which comprises running status detecting means for detecting the running status of a vehicle, as including an input torque from an engine; running resistance estimating means for estimating a running resistance on the basis of the running status of the vehicle; running resistance comparing means for comparing the estimated running resistance and a preset reference value; and shift characteristic changing means for changing shift characteristics in accordance with the comparison result of the running resistance comparing means. The automatic transmission control system further comprises temperature detecting means for detecting a temperature relating to the temperature of the engine; and decision means for deciding a specific engine running status, in which the output of the engine drops, on the basis of an output signal coming from the temperature detecting means. The running resistance comparing means changes the reference value in accordance with the decision result of the decision means. In short, the drop in the engine output is decided on the basis of the temperature relating to that of the engine so that the reference value for changing the shift characteristics is accordingly changed. As a result, even under the situations in which the output of the engine drops, as when the engine is cold or overheated, for example, the hill control is not misjudged but can be properly effected to match the situation of the actual running road surfaces.

Moreover, the drop in the engine output is decided to accordingly change the reference value for changing the shift characteristics. As compared with the prior art in which the map for computing the estimated value of the running resistance is selected, it is possible to reduce the capacity of the memory and the number of steps by the calibrations.

Further, the running resistance comparing means changes the reference value to the running resistance increasing side when the specific engine running status is decided by the decision means. During cold running of the engine, therefore, the hill decision can be accurately made by reflecting the engine output down amount upon the threshold value for the hill decision at each engine water temperature or, alternatively, A/T oil temperature.

The reference value includes a first reference value and a second reference value closer to the running resistance decreasing side than the first reference value, and the shift characteristic changing means changes the shift characteristics to those for uphill roads, when the estimated running resistance is closer in the running resistance comparing means to the running resistance increasing side than the first reference value, and to those for flat roads, when the estimated running resistance is closer to the running resistance decreasing side than the second reference value, but does not change the shift characteristics when the estimated running resistance is between the first and second reference values. This makes it possible to select the proper shift characteristics.

Moreover, a hysteresis region is set in the reference value for changing the shift characteristics so that the shift characteristics are not changed when the estimated running resistance is in the hysteresis region. As a result, transmission hunting can be prevented at the time of changing the shift characteristics.

Further, there is provided a control system for an automatic transmission, which comprises running status detecting means for detecting the running status of a vehicle, as including an input torque from an engine; reference acceleration computing means for computing the acceleration of the vehicle on a flat road based on the running status of the vehicle; actual acceleration computing means for computing the actual acceleration of the vehicle; running resistance estimating means for estimating a running resistance on the basis of the reference acceleration and the actual acceleration; running resistance comparing means for comparing the estimated running resistance and a preset reference value; and shift characteristic changing means for changing shift characteristics in accordance with the comparison result of the running resistance comparing means. The automatic transmission control system further comprises temperature detecting means for detecting a temperature relating to the temperature of the engine; and decision means for deciding a specific engine running status, in which the output of the engine drops, on the basis of an output signal coming from the temperature detecting means when the temperature relating to that of the engine is lower than a preset reference temperature. The running resistance comparing means changes the reference value to a running resistance increasing side, i.e., more negative, when the specific engine running status is determined in the decision means. During cold running of the engine, therefore, the hill decision can be accurately made by reflecting the engine output down amount upon the threshold value for the hill decision at each engine water temperature or, alternatively, A/T oil temperature.

The reference value includes a first reference value and a second reference value closer to the running resistance decreasing side than the first reference value, and the shift characteristic changing means changes the shift characteristics to those for uphill roads, when the estimated running resistance is closer in the running resistance comparing means to the running resistance increasing side than the first reference value, and to those for flat roads, when the estimated running resistance is closer to the running resistance decreasing side than the second reference value, but does not change the shift characteristics when the estimated running resistance is between the first and second reference values. This makes it possible to change the shift characteristics to those matching the running resistance.

Moreover, a hysteresis region is set in the reference value for changing the shift characteristics so that the shift characteristics are not changed when the estimated running resistance is in the hysteresis region. As a result, transmission hunting can be prevented at the time of changing the shift characteristics.

The reference acceleration is computed by weighting and averaging the preceding reference accelerations and the present reference acceleration, and the actual acceleration is computed by weighting and averaging the preceding actual accelerations and the present actual acceleration. As a result, an advantage in disturbances such as noises can be achieved to control the change stably in the shift map thereby to improve the drive feeling.

The invention is not limited to the foregoing embodiment but can be modified in various manners as would occur to one skilled in the art on the basis of this description, and such modifications should not be excluded from the scope of the invention.

What is claimed is:

1. A control system for an automatic transmission, comprising:

throttle opening detecting means for detecting a throttle opening for a vehicle;

engine rotation speed detecting means for detecting an engine rotation speed;

vehicle speed detecting means for detecting the vehicle speed;

engine output torque estimating means for estimating the engine torque on the basis of the throttle opening and the engine rotation speed by referring to a map;

reference acceleration computing means for computing the reference acceleration of the vehicle on a flat road on the basis of said engine output torque at least;

actual acceleration computing means for computing the actual acceleration of the vehicle;

running resistance estimating means for estimating a running resistance on the basis of said reference acceleration and said actual acceleration;

running resistance comparing means for comparing the estimated running resistance and a first reference value;

shift characteristic changing means for changing shift characteristics in accordance with the comparison result of said running resistance comparing means;

temperature detecting means for detecting a temperature relating to the temperature of the engine; and decision means for determining a specific engine running status, in which the output of the engine drops, on the basis of an output signal coming from said temperature detecting means, and said running resistance comparing means changes said first reference value to a second reference value to reflect an increase in running resistance when the specific engine running status is determined by said decision means.

2. A control system for an automatic transmission according to claim 1, wherein each of said first reference value and said second reference value include an uphill road reference value and a flat road reference value, said flat road reference value reflecting a decrease in running resistance than the running resistance reflected by said uphill road reference value, said shift characteristic changing means changes the shift characteristics to shift characteristics for uphill roads when said estimated running resistance is greater in said running resistance comparing means than said uphill road resistance value, and to shift characteristics for flat roads when said estimated running resistance is smaller than said flat road reference value, but does not change the shift characteristics when said estimated running resistance is between said uphill road reference value and said flat road reference value.

* * * * *